(12) United States Patent
Schilling et al.

(10) Patent No.: US 9,465,148 B2
(45) Date of Patent: Oct. 11, 2016

(54) SECURITY DOCUMENT

(71) Applicant: OVD Kinegram AG, Zug (CH)

(72) Inventors: Andreas Schilling, Hagendorn (CH); Wayne Robert Tompkin, Baden (CH); Rene Schaedler, Baar (CH)

(73) Assignee: OVD KINEGRAM AG, Zug (CH)

( * ) Notice: Subject to any disclaimer, the term of this patent is extended or adjusted under 35 U.S.C. 154(b) by 37 days.

(21) Appl. No.: 14/263,583

(22) Filed: Apr. 28, 2014

(65) Prior Publication Data

US 2014/0307321 A1 Oct. 16, 2014

Related U.S. Application Data

(62) Division of application No. 11/922,166, filed as application No. PCT/EP2006/005567 on Jun. 9, 2006, now abandoned.

(30) Foreign Application Priority Data

Jun. 14, 2005 (DE) .......................... 10 2005 027 380

(51) Int. Cl.
*G03H 1/00* (2006.01)
*G02B 5/18* (2006.01)
*B44F 7/00* (2006.01)
*B42D 25/29* (2014.01)
*B42D 25/324* (2014.01)
*B42D 25/328* (2014.01)

(52) U.S. Cl.
CPC ................. *G02B 5/18* (2013.01); *B42D 25/29* (2014.10); *B44F 7/00* (2013.01); *G02B 5/1861* (2013.01); *G03H 1/0011* (2013.01); *B42D 25/324* (2014.10); *B42D 25/328* (2014.10); *B42D 2035/36* (2013.01)

(58) Field of Classification Search
CPC ..... G02B 5/18; G02B 5/1828; G02B 5/1876
USPC ......... 359/2, 569, 565, 571, 573; 282/86, 72
See application file for complete search history.

(56) References Cited

U.S. PATENT DOCUMENTS

| 3,058,394 | A | | 10/1962 | Edlin |
| 3,982,527 | A | | 9/1976 | Cheng et al. |
| 4,304,809 | A | * | 12/1981 | Moraw ................. G06K 19/16 283/114 |

(Continued)

FOREIGN PATENT DOCUMENTS

| CA | 2163528 | 4/1995 |
| CA | 2294755 | 1/1999 |

(Continued)

OTHER PUBLICATIONS van Renesse, R., "Optical Document Security," 1st Edition, Artech House, pp. 221-223 (1994).

*Primary Examiner* — Audrey Y Chang
(74) *Attorney, Agent, or Firm* — Hoffmann & Baron, LLP

(57) ABSTRACT

Described is a security document with a transparent security element (12) which is arranged in a window or in a transparent region of the security document and has a structure layer, in which a first region (12f) of the structure layer has an asymmetrical diffractive relief structure, wherein the first region (12f) has an optical effect which is unexpectedly different in a front view and in a rear view of the security document.

5 Claims, 14 Drawing Sheets

(56) References Cited

U.S. PATENT DOCUMENTS

| | | | |
|---|---|---|---|
| 4,856,857 A * | 8/1989 | Takeuchi | G03H 1/0252 |
| | | | 283/72 |
| 5,073,007 A | 12/1991 | Kedmi et al. | |
| 5,101,184 A | 3/1992 | Antes | |
| 5,285,314 A * | 2/1994 | Futhey | G02B 5/1876 |
| | | | 359/565 |
| 5,461,239 A | 10/1995 | Atherton | |
| 5,492,370 A | 2/1996 | Chatwin et al. | |
| 5,700,550 A | 12/1997 | Uyama et al. | |
| 6,157,487 A | 12/2000 | Staub et al. | |
| 2002/0027361 A1 | 3/2002 | Hardwick et al. | |
| 2003/0169468 A1 | 9/2003 | Menz et al. | |
| 2004/0032659 A1 | 2/2004 | Drinkwater | |
| 2004/0130760 A1 * | 7/2004 | Schilling | B42D 25/328 |
| | | | 359/2 |
| 2005/0068625 A1 | 3/2005 | Schilling et al. | |
| 2005/0104364 A1 | 5/2005 | Keller et al. | |
| 2005/0127663 A1 | 6/2005 | Heim | |
| 2005/0128590 A1 | 6/2005 | Schilling et al. | |
| 2005/0151368 A1 | 7/2005 | Heim | |
| 2006/0072225 A1 | 4/2006 | Schilling et al. | |
| 2006/0251863 A1 | 11/2006 | Katschorek et al. | |
| 2007/0183045 A1 | 8/2007 | Schilling et al. | |

FOREIGN PATENT DOCUMENTS

| | | |
|---|---|---|
| DE | 4334847 | 4/1995 |
| DE | 19729918 | 1/1999 |
| DE | 10040785 | 3/2002 |
| DE | 10129939 | 1/2003 |
| DE | 10254499 | 6/2004 |
| DE | 10318157 | 11/2004 |
| EP | 0012375 | 6/1980 |
| EP | 0360969 | 4/1990 |
| JP | 2000206320 | 7/2000 |
| JP | 2001315472 | 11/2001 |
| JP | 2003202414 | 7/2003 |
| JP | 2004302026 | 10/2004 |
| WO | WO9216378 | 10/1992 |
| WO | WO9502200 | 1/1995 |
| WO | WO9719821 | 6/1997 |
| WO | WO9959036 | 11/1999 |
| WO | WO03053713 | 7/2003 |
| WO | WO03055691 | 7/2003 |
| WO | WO03059643 | 7/2003 |
| WO | WO03068525 | 8/2003 |
| WO | WO03070482 | 8/2003 |
| WO | WO2004049250 | 6/2004 |
| WO | WO2005042268 | 5/2005 |

* cited by examiner

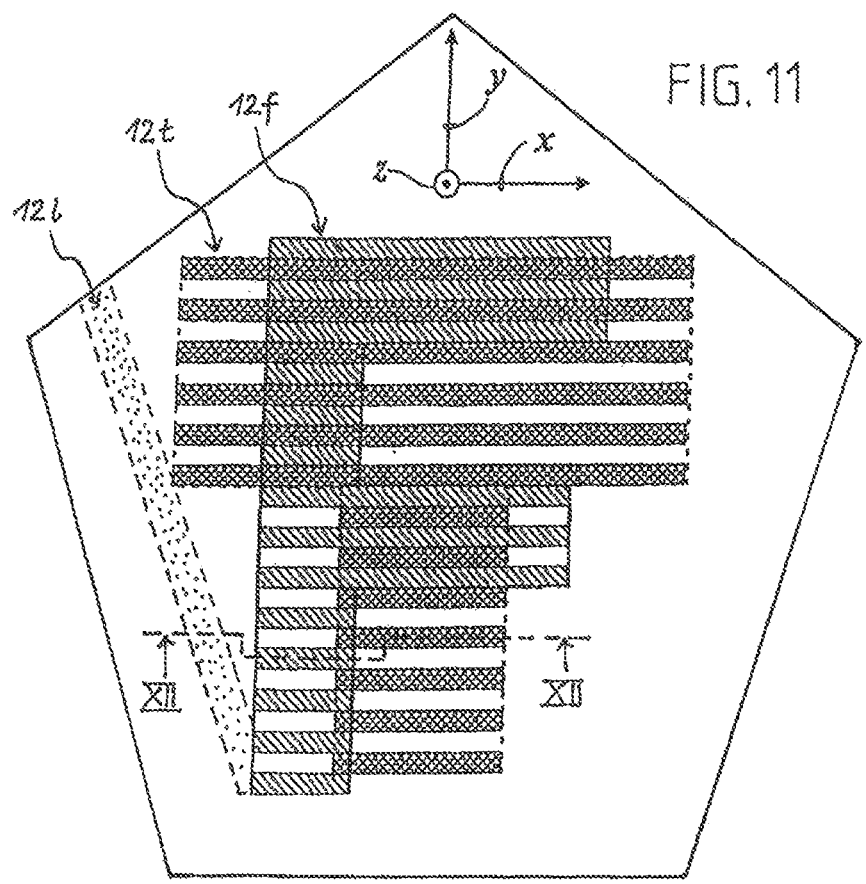
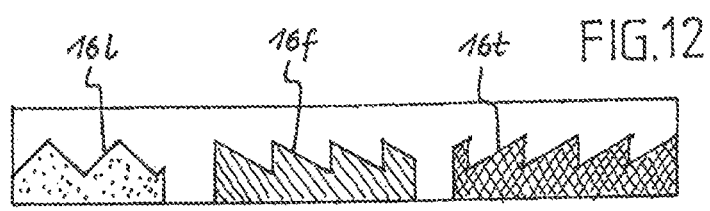

SECURITY DOCUMENT

This application is a divisional application of U.S. application Ser. No. 11/922,166, filed Mar. 10, 2008, which claims priority based on an International Application filed under the Patent Cooperation Treaty, PCT/EP2006/005567, filed on Jun. 9, 2006, and German Application No. DE 102005027380.7-45, filed on Jun. 14, 2005.

BACKGROUND OF THE INVENTION

The invention concerns a security document comprising a transparent security element which is arranged in a window or in a transparent region of the security document and which has a transparent structure layer and a diffractive relief structure shaped into a first surface of the structure layer.

The increasing availability and technical maturity of colour copiers and scanners results in copies which in terms of colour quality and resolution can be less and less distinguished from the original. Therefore security documents are protected by what are referred to as OVDs, that is to say optically variable devices which produce different optical effects in dependence on the angle of view and which are difficult to copy. It is however possible to produce the optical effects by imitated OVDs which give the viewer a comparable optical impression.

DE 197 29 918 A1 discloses a security and/or value-bearing document which at different locations has a security feature and a verification element, wherein the verification element is disposed in coincident relationship with the security feature in order to establish the authenticity of the security feature. The verification element is disposed in a window of the security and/or value-bearing document and contains optical elements such as for example lenses, cylindrical lenses or Fresnel lenses which permit verification of the security feature. It can also be provided that the verification and the security element form moire structures or colour changes when disposed in mutually superposed relationship.

DE 100 40 785 A1 describes a security system in which in incident light, outside the carrier plane, a first security element reconstructs a hologram whose encrypted information is rendered readable by a second security element which is moved into the plane of the hologram by folding the security element.

Such solutions suffer from the disadvantage that they are complicated and expensive to manufacture and presuppose skills and knowledge relating to the use of the security elements.

DE101 299 39 A1 describes an optically variable surface pattern with relief structures for producing at least two representations which can be separately perceived by a viewing person and which upon production of a copy by means of a colour copier, are all transferred on to the copy.

DE 101 290 939 A1 describes an optically variable surface pattern with relief structures for producing at least two representations which can be separately perceived by a viewing person and which upon production of a copy by means of a colour copier, are all transferred on to the copy.

WO 03/059643 A1 discloses a diffractive security element with integrated optical waveguide.

DE 102 54 499 A1 discloses a layer arrangement having a structure which produces a lens-like effect and which has an optical-diffraction action.

DE 103 18 157 A1 describes a film and an optical security element. The film has a carrier layer and a replication layer, wherein a diffractive relief structure is introduced into the replication layer for orientation of a liquid crystal material.

EP 0 012 375 A2 describes an identification card comprising a plurality of layers which have security features in the form of grating images and the card core of which has a window into which is fitted a grating image carrier for the grating image.

SUMMARY OF THE INVENTION

Now the object of the present invention is to provide a security document which is inexpensive to manufacture and which solely by viewing a window of a security element deploys an optical effect which is striking to the observer and which is typical in respect of authenticity.

The object of the invention is attained by a security document comprising a carrier substrate and a transparent security element which is arranged in a window or in a transparent region of the carrier substrate and which has a transparent structure layer and a diffractive relief structure shaped into a first surface of the structure layer, wherein in a first region of the structure layer a first relief structure is shaped into the first surface of the structure layer, which is in the form of an asymmetrical diffractive relief structure with a period length of up to 20 μm and an alphanumeric and/or graphic information or representation which is visible for a viewer on a front side and/or a rear side of the security element, wherein in respect of the first surface adjoining the structure layer are one or more layers which are in the form of reflective transparent layers and/or are in the form of transparent layers having a refractive index difference>0.2 in relation to the structure layer so that both the light incident on the front side of the security element and also the light incident on the rear side thereof is diffracted in the first region by the first relief structure and wherein the first relief structure is such that the first relief structure in incident light produces an optical action which is different in the front view and in the rear view such that the information visible to the viewer on the front side and/or the rear side is not merely a laterally reversed representation of the respective item of information visible on the opposite side.

Accordingly a different appearance is unexpectedly presented on the front side by virtue of the transparency of the security element, from that on the rear side, in which respect different representations, brightnesses, contrasts, colour effects, magnification effects or reduction effects, 3-D effects and so forth can be visible, alone or in combination.

In that respect the transparency security element does not have to be transparent locally everywhere but only appear substantially transparent to the viewer. Thus for example there may also be opaque background or pattern regions, or there may be a raster image comprising opaque and transparent regions without the transparent character of the security element being lost to the viewer.

The unexpected effect is revealed with an asymmetrical diffractive relief structure in incident light. Such a relief structure has a sawtooth-shaped periodic configuration, wherein the two sawtooth flanks of a period differ significantly from each other in terms of their slope. The relief structure within a period is therefore of an asymmetrical configuration. Preferably it can be provided that the one flank is of a finite slope and the other flank is of an infinite slope. By virtue of that asymmetry the asymmetrical relief structure involves a different optical appearance when viewing the front side and the rear side. When viewing the security document the asymmetrical relief structure disposed in the first region of the security element is visible from the one side by virtue of diffraction of the incident light, and invisible from the other side. This can also involve a clear difference in brightness which the diffractive relief structures can have with a differing viewing direction. With a suitable configuration, the first region may not be visible in transillumination. Accordingly it can also not be copied with an optical copier.

If the relief structure of the first region is a diffractive asymmetrical relief structure with a non-constant spatial frequency, the relief structure can admittedly be visible from the front side of the security document and also from the rear side thereof, but nonetheless when viewed in incident light, for each side, it exhibits a different optical effect, as is described in greater detail hereinafter. A non-constant spatial frequency is synonymous with a non-constant period length for the spatial frequency is inversely proportional to the period length.

When viewing the security document according to the invention exactly turning over the security document when viewing the front side and the rear side is not an important aspect for the viewer unconsciously selects the optimum position for producing the optical effect, insofar as he tilts the security document to and fro until the intended optical effect occurs.

Further advantageous configurations are recited in the appendant claims.

It can be provided that a second region of the structure layer has a second relief structure which is in the form of an asymmetrical diffractive structure and the configuration of which is formed substantially in mirror image relationship with the configuration of the first relief structure shaped in the first region, wherein the second relief structure in incident light has an optical effect which is different in the front view and in the rear view.

It can further be provided that the first region and the second region of the structure layer form mutually interlocking rasters. By virtue of the rastering effect the regions can apparently be arranged one over the other without interfering with each other. In that case there is only ever the one region that is visible, with the other region being invisible. With sufficiently fine rastering, that is to say with a rastering which cannot be resolved with a naked human eye, the respective visible region appears as a homogeneous region. It can be provided that the raster width is <300 µm, preferably 50 µm.

It can advantageously be provided that the first region and the second region form mutually interlocked linear rasters. It is however also possible to provide any other raster principle, for example a dot raster with square pixels.

A further advantageous configuration provides that the relief structure of the first and/or second region is in the form of a blaze grating. The blaze grating is a diffraction grating. On a blaze grating, in dependence on the grating constant d, the wavelength λ and the diffraction order n, there is the following relationship between the entrance angle $\theta_{in}$ and the exit angle $\theta_{OUT}$:

$$\sin \theta_{OUT} = \sin \theta_{in} n^* \lambda / d.$$

In other words, polychromatic light, such as for example daylight is broken down into its basic colours by diffraction at the blaze grating. By virtue of the choice of the grating constant d however the blaze grating can be in the form of an achromatic blaze grating in which the coloured rays at least of the first diffraction order are brought together again in a viewing angle range and thus polychromatic light again issues from the blaze grating. In that way about 90% of the incident light can be diffracted in the form of a focused beam whereby the image effect is of a particularly high-contrast nature. It is from that property that the name of the grating is derived.

It can advantageously be provided that the blaze grating is in the form of an achromatic blaze grating with a grating constant of 20 µm to 3 µm, preferably of 10 µm, and is of a profile depth of from 0.3 µm to 5 µm, preferably 1.5 µm. In dependence on the profile depth higher diffraction orders can produce a higher level of intensity than the first diffraction order.

It can further be provided that the blaze grating is a chromatic blaze grating with a grating constant of less than 2 µm, preferably 1 µm. In that case the blaze grating lights up upon being illuminated with daylight, when being tilted, in the colours of the rainbow.

For the described effect the blaze grating is held in such a way that the flanks of finite slope diffract the incident light and deflect it into an eye of an observer. Therefore the effect only ever occurs at the first or the second relief structure, in dependence on the viewing direction, wherein the two relief structures can be of the same configuration and can be arranged in mirror-image relationship with each other. In that case only one respective relief structure is so oriented that the light diffracted thereby passes into the eye of the observer and in that way renders visible the region which is filled with the relief structure.

To further enhance image contrast it can be provided that the structure layer is coated at least region-wise with a reflecting metallic layer. The metallic layer forms a reflection layer which presents a markedly improved degree of reflection in comparison with the interface reflection at the interface between two layers with different refractive indices. The interface can also be for example an outer face of a layer, which adjoins air. The interface reflection is to be observed for example at shop window panes which can hinder a view of the goods presented behind the shop window pane. That interface reflection is markedly polarisation- and angle-dependent.

A further point of disadvantage is that for example oil or water deposited on the surface of the structure layer impedes interface reflection because oil and water can have approximately the same refractive index as the structure layer. Wear and tear and surface cracks can adversely affect a non-coated structure layer in regard to its optical action. Finally there is the disadvantage that an effect based on interface reflection can be copied by galvanic shaping.

An advantageous configuration provides that the reflecting metallic layer is formed portion-wise from different materials, in particular to produce different colours, and preferably the first region is coated with a first metallic layer and the second region is coated with a second metallic layer. The metals can be for example aluminium or gold so that the structure layer appears silver when viewed from one side and golden when viewed from the other side. It can also be provided that two metallic layers are arranged in mutually superposed relationship so that the one metallic layer is visible from the one side and the other metallic layer is visible from the other side. By way of example an Al-layer can be coated in that fashion with a Cu-layer.

It can be provided that the metallic layer has opaque regions in a pattern form. Such a feature can form a further security feature which is difficult to imitate.

The opaque metal layer regions are formed in such a thickness that they do not appear transparent in transillumination, for example being of a thickness of 400 nm. In particular however the thickness is only about 50 nm.

It can however also be provided that the metallic layer is formed at least region-wise of such a thickness that it appears transparent in transillumination. Such a transparent metallic layer is of a thickness of a few nm, for example 20 nm. The optimum value is material-dependent and wavelength-dependent and can preferably be ascertained by tests because of the complex relationships of the influencing parameters. A layer which is transparent in the transillumination mode is particularly effective as unexpectedly in incident light different representations are visible in dependence on the side involved. It is particularly well copy-protected. It is further to be noted that the degree of transparency also depends on the depth-to-width ratio of the relief structure arranged under the metallic layer.

An embodiment of the invention provides that the structure layer is coated at least region-wise with a dielectric HRI layer (HRI=high refractive index) with a consequently high refractive index, wherein the coated regions are of semi-transparent nature. In that way the interface reflection can be improved and thus the effect according to the invention can be enhanced. The dielectric layer can be for example a protective lacquer which is applied by printing or by a wiper device and which completely fills up the relief structures of the structure layer.

It can be provided that the first relief structure or the second relief structure is a diffractive relief structure which is formed starting from a reference point in at least two directions with changing spatial frequency or depth and to which a reflection layer is applied. In the case of the changing spatial frequency the flank slope of the asymmetrical relief structure also changes, that is to say a flank angle between the flank and a main plane which is parallel to the surface of the relief structure increases with increasing flank slope or flank steepness. It can be provided that the spatial frequency increases starting from the reference point, preferably continuously increases. The flank steepness thus increases towards the edge of the relief structure. In that respect the inclined flanks can also be portions of steady curves. This therefore involves a structure having an optical-diffraction effect, with a relief structure which preferably continuously changes in respect of the spatial frequency and optionally further grating constants over the surface region and which is of such a configuration that the respective one flanks of the grating grooves extend parallel to each other and approximately parallel to a perpendicular to the main plane of the relief structure while the angle of the respective other flanks of the grating surfaces with respect to the main plane changes substantially continuously over the surface region, with the grating depth being at most 10 µm.

By virtue of the reflection layer the above-described relief structure can act as a hollow mirror. A diffractive relief structure acting as a hollow mirror appears as a convex mirror considered from the one side and a concave mirror considered from the other side. That effect is to be observed for example on a coffee spoon. The hollow mirror effect however can also be observed on an uncoated transparent or partially transparent relief structure if the refractive indices of the structure layer and the adjoining medium sufficiently differ from each other.

Many different optical effects can be achieved with the above-described relief structure. By way of example images, graphics, logos or texts can apparently be disposed in front of or behind the surface of the security element. Such an effect can admittedly also be achieved with holograms but the mirror images produced at the hollow mirror involve a stronger light effect than a hologram and can be freely selected in terms of colour.

It can further be provided that the structure layer has a third region which exhibits the same optical effect when viewed from the front side and from the rear side. Such a region can act as a background region. It can be provided that the third region is provided with a symmetrical diffractive relief structure, for example being in the form of a hologram or a KINEGRAM®.

The term symmetry is not used here in the strictly mathematical sense but to distinguish from asymmetrical relief structures which are described hereinbefore. Relief structures are also identified as symmetrical which, upon folding at a line of symmetry, cannot be brought completely into coincident relationship, but the flanks thereof differ so little from each other in the magnitude of their slope that the described, viewing-dependent optical effect does not occur.

It can further be provided that the third region is in the form of a matte structure or a thin layer system. The matte structure is a diffusively light-scattering relief structure which therefore appears matte. Such a relief structure can typically involve a structure depth of ≤10 µm. A Fourier hologram or a computer-generated hologram, referred to as a kinoform, with a concealed feature, can also act as a matte structure. The function thereof is to project a concealed feature in a reflection or a transmission mode.

Thin layer systems are formed from a sequence of thin layers of a thickness of $\lambda/2$ or $\lambda/4$ respectively and present tilt angle-dependent colour effects.

In a further advantageous configuration it is provided that a liquid crystal layer is arranged in the third region. Such a region can be for example in the form of a black region or a multi-colour region or may only be visible in the UV or infrared range or may give the impression of a precious stone.

It can be provided that the regions of the security element are in register relationship with each other and/or with regions of the security document.

A further configuration provides that the security document is a multi-layer film body with a transparent carrier layer. The carrier layer can be a transparent polymer film of a layer thickness of about 70 µm.

It can also be provided that the security element is a transfer layer of a transfer film.

In a further configuration it is provided that the structure layer is an outer layer of the security document or a portion of an outer layer of the security document. The structure layer can therefore be an integral constituent part of the security document and in that case can be arranged in a transparent region of the security document. Such a configuration can advantageously be provided if the security document is a plastic card.

It can further be provided that the structure layer is an inner layer of the security document or a portion of an inner layer of the security document. In that way the structure layer is protected particularly well and is not accessible to manipulation from the outside.

If the first surface of the structure layer is exposed, that is to say is accessible from the exterior, the structure layer, with suitable dimensioning, can also be detectable by touch and in that way form a further security feature. In that respect it can also give rise to a tactile impression which is different on the front side and on the rear side.

BRIEF DESCRIPTION OF THE DRAWINGS

The invention is described by way of example hereinafter by means of a number of embodiments with reference to the accompanying drawings in which:

FIG. 11 shows a diagrammatic view on an enlarged scale of an alternative embodiment of the security document of FIGS. 1a and 1b, and FIG. 12 shows a diagrammatic view of the relief structure in section along section line XII-XII in FIG. 11.

DETAILED DESCRIPTION OF THE INVENTION

Figure 1A:
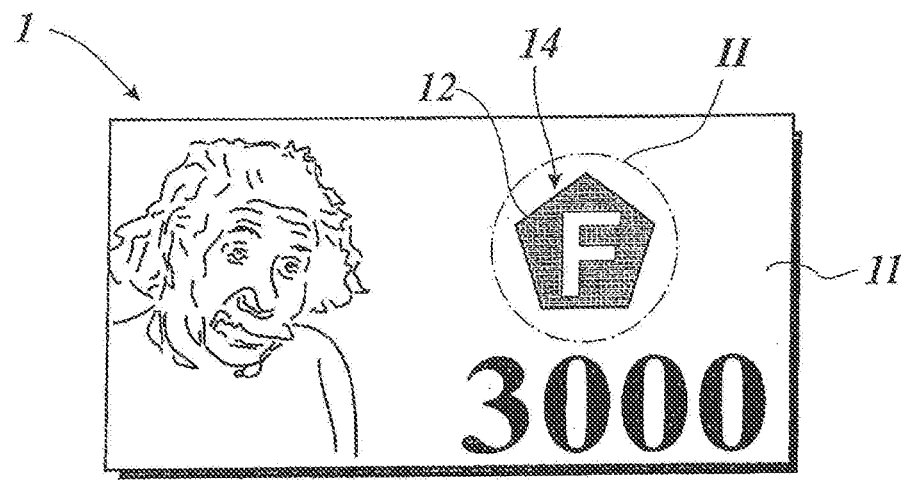
FIGS. 1a and 1b show a first example of use of a security document according to the invention.
Figure 1B:
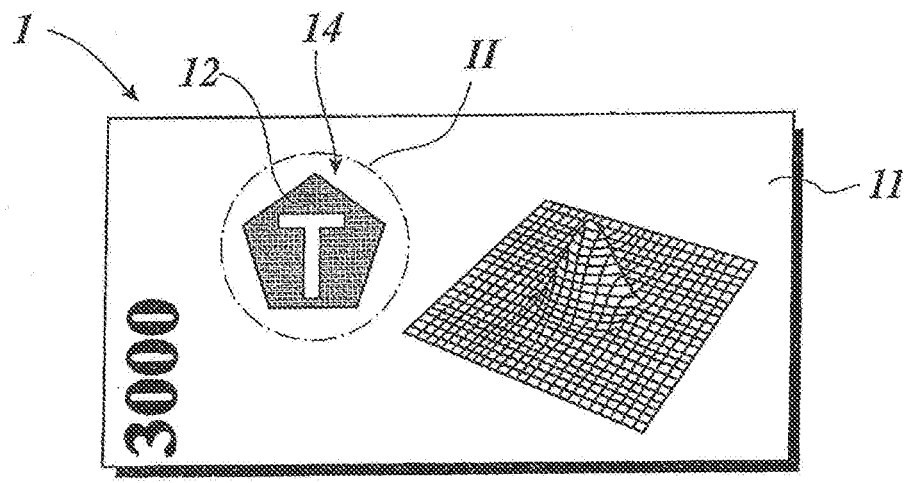

FIGS. 1a and 1b show a security document 1 with a transparent security element 12 as a front view and a rear view respectively.

In the example shown in FIGS. 1a and 1b the security document 1 is a value-bearing document, for example a banknote or a cheque. In addition it is also possible for the security document 1 to form an identification document, for example a pass.

The security document 1 comprises a flexible carrier 11 on which the transparent security element 12 is arranged in a region 14. The carrier 11 is preferably a carrier consisting of paper material which is provided with printing thereon and into which further security features are introduced, for example watermarks or security threads. There may also be provided a non-flexible carrier 11 such as for example that may be the case with ID-cards, passport inserts and the like.

It is however also possible that the carrier 11 is a plastic film or a laminate comprising one or more paper and plastic layers.

In the region 14, a window-shaped opening is formed in the carrier 11, for example by stamping. The opening is then closed again by application of the transparent security element 12. Thus the security document 1 has in the region 14 a transparent window with the transparent security element 12.

It is however also possible that a transparent or partly transparent material is already used as the material for the carrier 11 and the carrier can thus remain in the region 14. That is the case for example if the carrier 11 comprises a transparent plastic film which is not provided with a clouding layer in the region 14. Furthermore it is also possible for the transparent window to be already produced in production of the paper and for the transparent security element 12 to be introduced into the carrier 11 in the manner of a wide security thread.

As shown in FIGS. 1a and 1b the letter 'F' can be seen on the security element 12 when viewing the front side of the security document 1. The letter 'T' is to be seen on the security element 12 when viewing the rear side of the security document 1.

The detailed structure of the security element 12 and the mode of operation thereof will now be described with reference to FIGS. 2, 3a, 3b, 4a, 4b, 5a and 5b.

Figure 2:
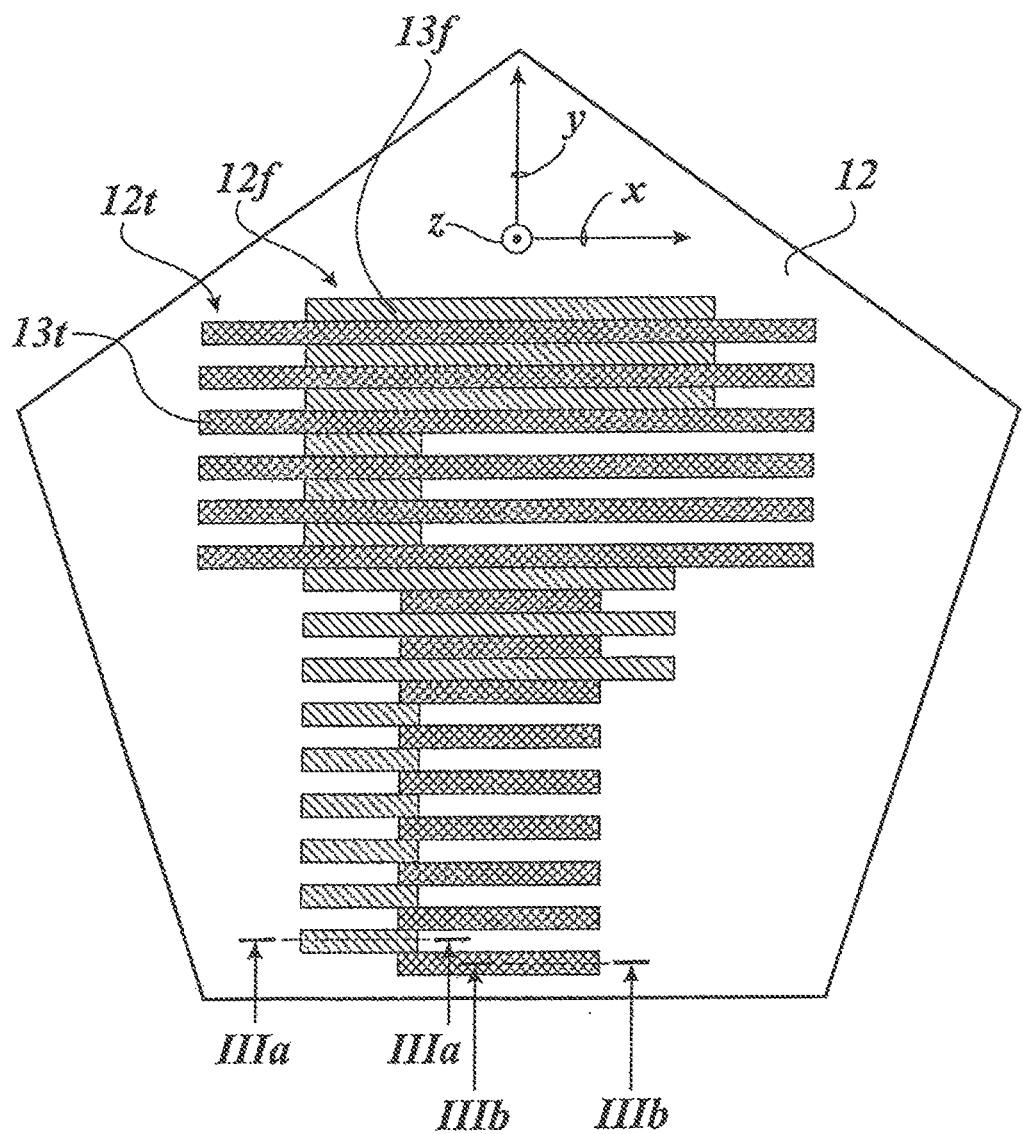
FIG. 2 shows a diagrammatic view on an enlarged scale of the security document of FIGS. 1a and 1b.

FIG. 2 shows a diagrammatic view on an enlarged scale of the security element 12 of FIGS. 1a and 1b. The security element 12 has a F-shaped region 12f and a T-shaped region 12t which are in mutually interlocking relationship and which are formed from raster lines 13f and 13t respectively. The raster lines are at a spacing of about 50 µm relative to each other and are between 5 mm and 20 mm long. The raster lines 13f of the F-shaped region 12f are emphasised by simple hatching and the raster lines 13t of the T-shaped region 12t are emphasised by cross hatching. The raster lines 13f, 13t are not to be separated from each other when viewed without optical aids, that is to say from a typical viewing distance of 250 mm, so that both the F-shaped region 12f and also the T-shaped region 12t appear to be homogeneous regions to a viewing person.

To explain the mode of operation of the security element 12, x, y, z-coordinate systems are shown in FIGS. 2, 3a, 3b, 4a, 4b, 5a, 5b and 9a, 9b. In that respect the x-axis and the y-axis denote the surface of the security element 12 and the z-axis denotes the heightwise extent.

Figure 3A:
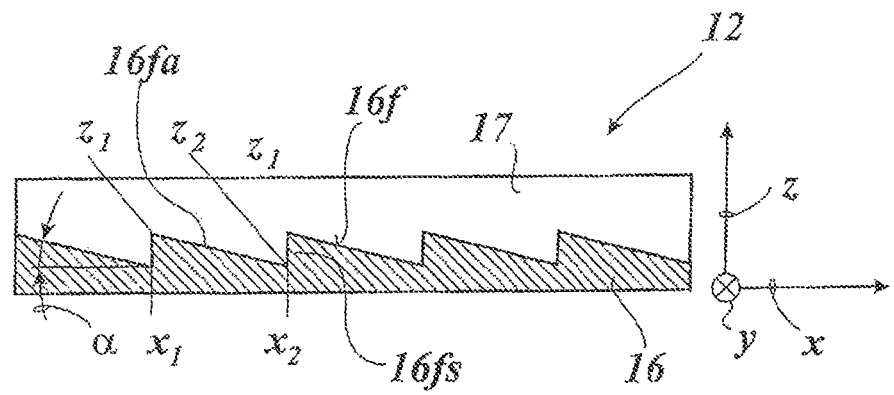
FIG. 3a shows a diagrammatic view of the relief structure in section along section line IIIa-IIIa in FIG. 2.

FIG. 3a is now a diagrammatic view in section through the security element 12 along a raster line 13f. The optical action of the raster line 13f of the security element 12 is caused by two adjacent structure layers 16 and 17 which have different optical refractive indices $n_{16}$ and $n_{17}$ respectively. In that way a relief structure 16f provided in the interface between the two structure layers 16 and 17 can deploy its optical effect. The structure layer 17 arranged on the structure layer 16 can also be formed by air or another ambient medium. What is decisive in regard to the optical effect which is described hereinafter and which is based on reflection at the relief structure 16 is an adequate difference in the refractive indices $n_{16}$ and $n_{17}$:

$$n_{16} - n_{17} > 0.2$$

Because however only a small part of the light incident on the relief structure 16f is reflected, a reflection layer can advantageously be provided on the relief structure 16f, for example consisting of Ag, Al, Au, Rh, Cu, Cr, Ti, TiO.sub.2 or ZnS or the structure layer 17 can be formed with a high refractive index.

It can be provided that the structure layer 16 is at the same time a carrier layer into which the relief structure 16*f* is formed for example by means of hot stamping and that the structure layer 17 is formed for example by a protective lacquer or adhesive which is applied over the full surface area by printing or by a wiper device.

As can be seen from FIG. 3*a*, the relief structure 16*f* is of a sawtooth-shaped periodic configuration. In that way it forms a blaze grating which is characterised in that a given diffraction order of the incident light appears particularly light or that a given incidence and reflection angle gives a particularly great level of lightness.

A portion of the relief structure 16*f* is further described by way of example, which extends in the region $x_1$ to $x_2$ and in which the relief structure falls continuously from a starting height $z_1$ to a final height $Z_2$. A first flank 16*fa* includes an angle $\alpha$, the so-called blaze angle, with the x-axis. Formed at the point $x_2$ is a second flank 16*fs* which extends parallel to the z-axis and at which the relief structure 16*f* goes back up to the starting height $z_1$. The section $x_1 x_2$ denotes the grating constant d of the relief structure 16*f*. It is 10 μm in the illustrated embodiment. The spatial frequency f of the relief structure 16*f* can be calculated as follows from the grating constant d:

$$f=1/d=\frac{1}{10} \, \mu m=\frac{1}{10}^{-2} \, mm=100 \text{ lines/mm}.$$

The height $z_1 z_2$ of the second flank 16*fs* denotes the profile depth of the relief structure 16*f*. It is 1.5 μm in the illustrated embodiment.

Figure 3B:
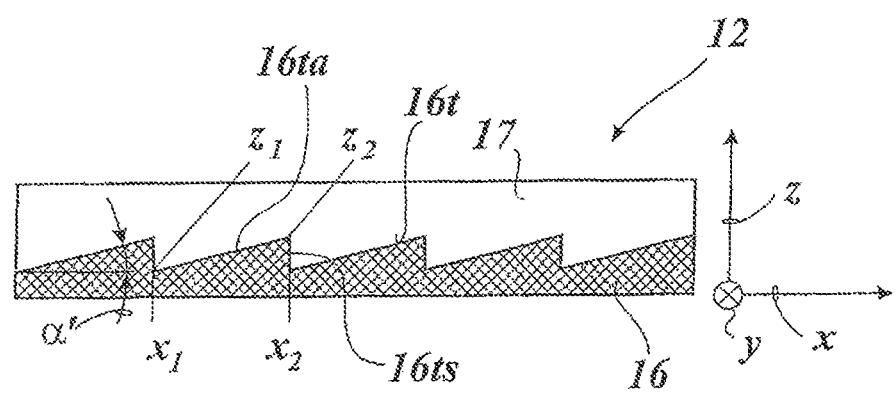
FIG. 3b shows a diagrammatic view of the relief structure in section along section line IIIb-IIIb in FIG. 2.

FIG. 3*b* is now a similar diagrammatic view to FIG. 3*a*, showing a section through the security element 12 along the raster line 13*t*. As can be seen therefrom the structure layer 16 in the region of the raster line 13*t* has a relief structure 16*t* which differs from the relief structure 16*f* in FIG. 3*a* in that there is a first flank 16*ta* with a positive rise, that is to say between $x_1$ and $x_2$ it rises continuously from the starting height $z_1$ to the final height $z_2$ and falls along a vertical second flank 16*ts* at the point $x_2$ to the starting height $z_1$ again. The first flank 16*ta* includes a blaze angle $\alpha'$ with the x-axis.

The comparison between the relief structures 16*f* and 16*t* as shown in FIGS. 3*a* and 3*b* shows that the relief structure 16*t* is a relief structure 16*f* which is mirrored at the z-axis, in which respect both relief structures have the same blaze angle in terms of magnitude. The relief structures 16*f* and 16*t* respectively shown in FIGS. 3*a* and 3*b* are of such dimensions that the incident polychromatic light, for example daylight, is split up in such a way that the coloured partial rays produced at the relief structure overlap and again form a colourless beam. This therefore involves an achromatic blaze grating which in the illustrated embodiment, as indicated hereinbefore, has a grating constant of 10 μm and a profile depth of 1.5 μm. It can reflect in a limited angular range over 90% of the light radiated thereon and thus forms a very high level of contrast.

Figure 4A:
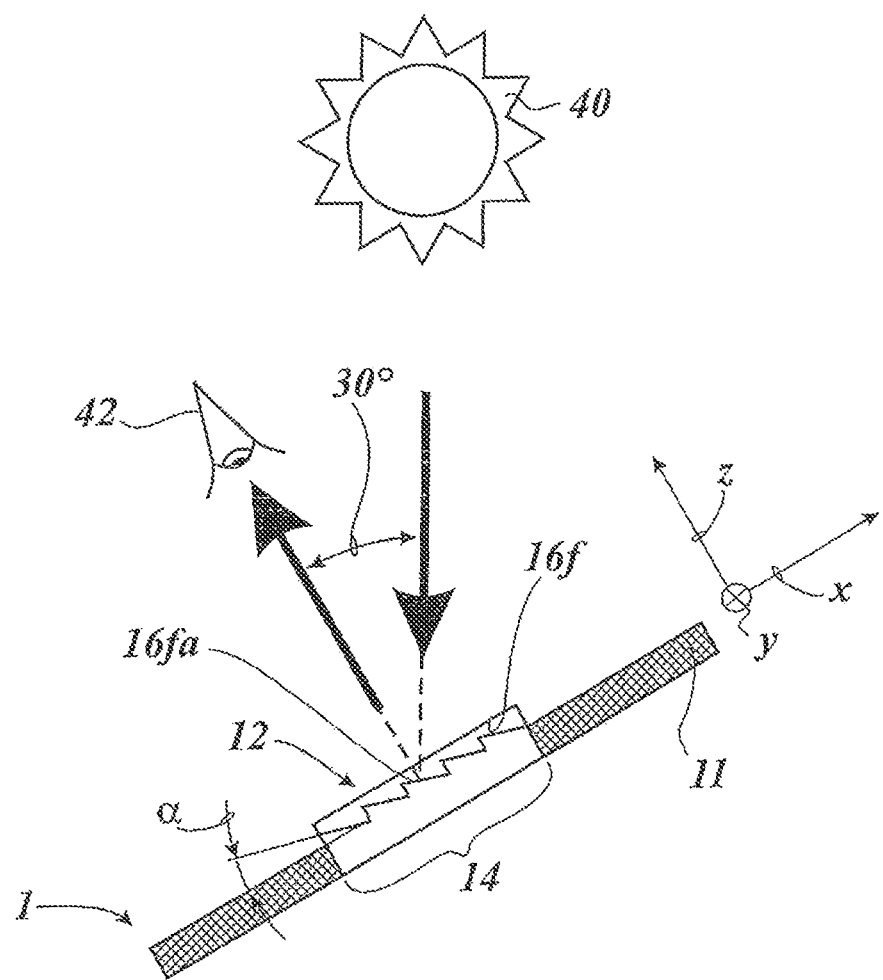
FIG. 4a shows a diagrammatic view of the function of the relief structure in FIG. 3a when viewing from the front side.
Figure 4B:
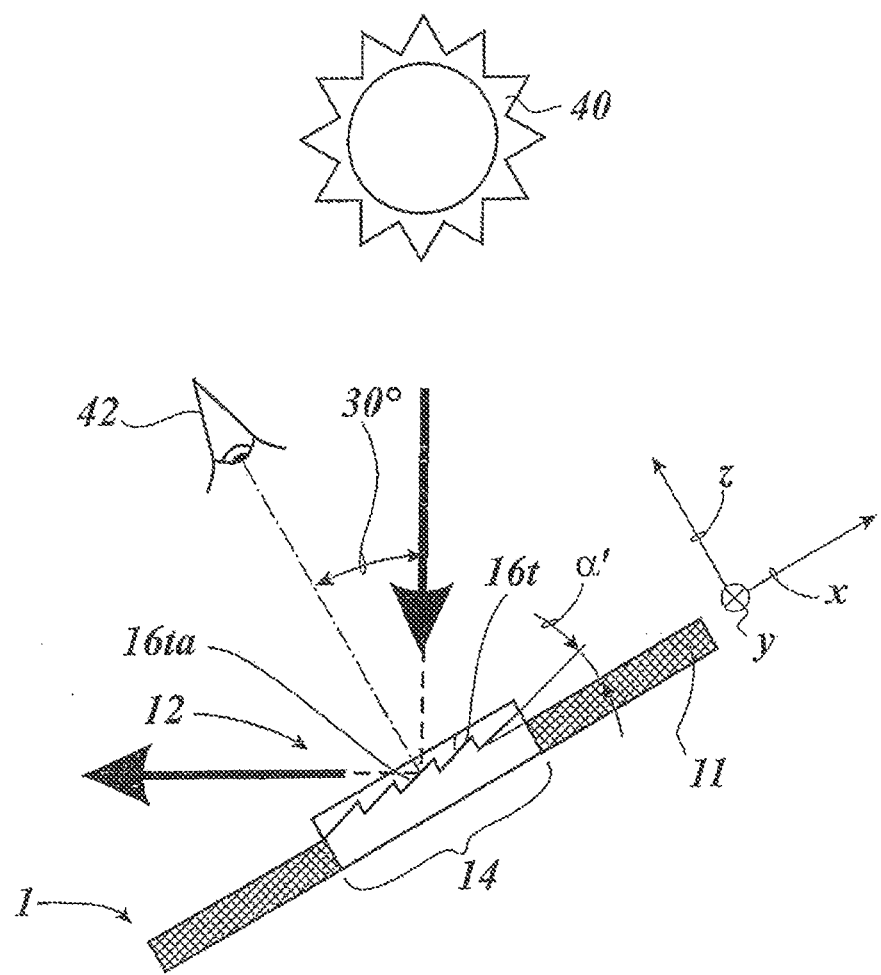
FIG. 4b shows a diagrammatic view of the function of the relief structure in FIG. 3b when viewing from the front side.

FIGS. 4*a* and 4*b* now show the action of the above-described relief structures.

FIG. 4*a* shows a diagrammatic view in section of the security document 1 (see FIG. 1), the front side of which is illuminated by a light source 40. The security element 12 is arranged in the window 14 of the security document 1, FIG. 4*a* showing the section through a strip-shaped portion into which the relief structure 16*f* is shaped. The first flanks 16*fa* of the relief structure 16*f* (see FIG. 3*a*) deflect beams emitted by the light source 40 into an eye 42 of a viewer. The beams emitted by the light source 40 include an angle of 30° with the viewing direction of the viewer. The viewing direction of the viewer is directed perpendicularly on to the surface of the security document 1. Because only the beams of the light source 40 are deflected into the eye 42, which are reflected at the strip-shaped portions of the F-shaped region 12*f* (see FIG. 2) of the security element 12, the viewer sees an 'F' which stands out in brightly lit form from its surroundings.

FIG. 4*b* now shows the action of the relief structure 16*t* whose rising first flanks 16*ta* deflect the light from the light source 40 past the eye 42 of the viewer. Consequently no beams pass from the T-shaped region 12*t* of the security element 12 (see FIG. 2) into the eye 42 of the viewer and the 'T' is not visible.

Figure 5A:
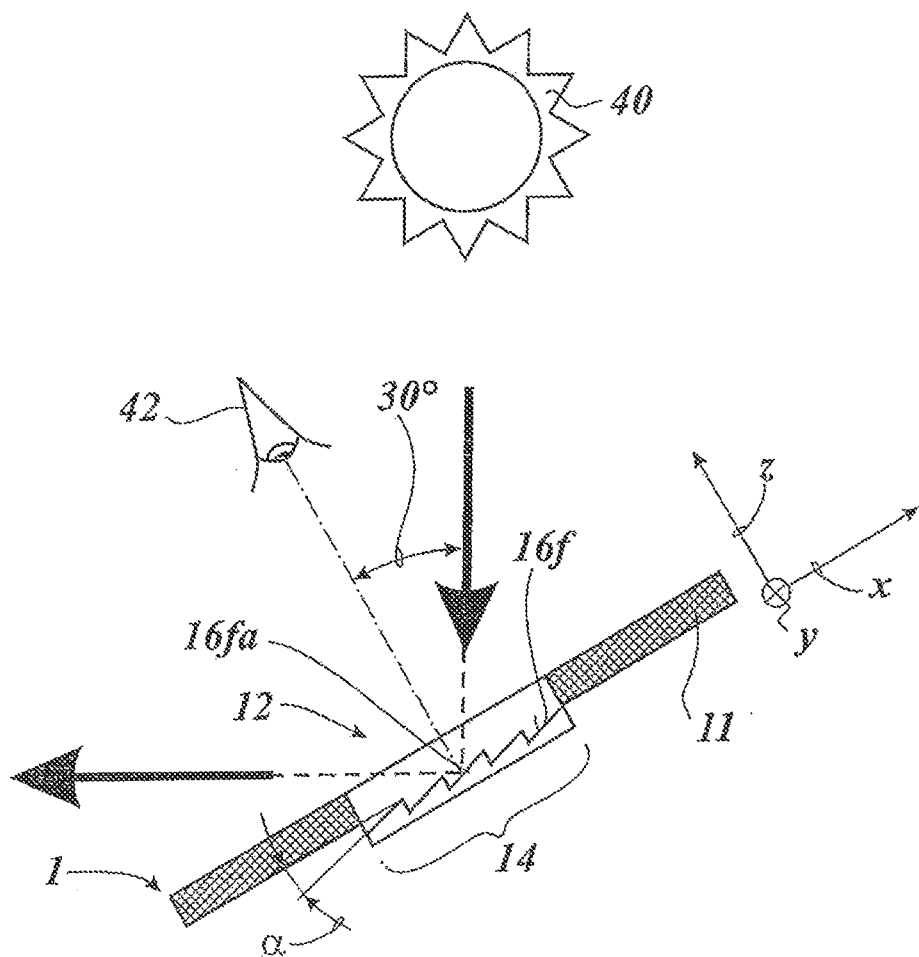
FIG. 5a shows a diagrammatic view of the function of the relief structure in FIG. 3a when viewing from the rear side.
Figure 5B:
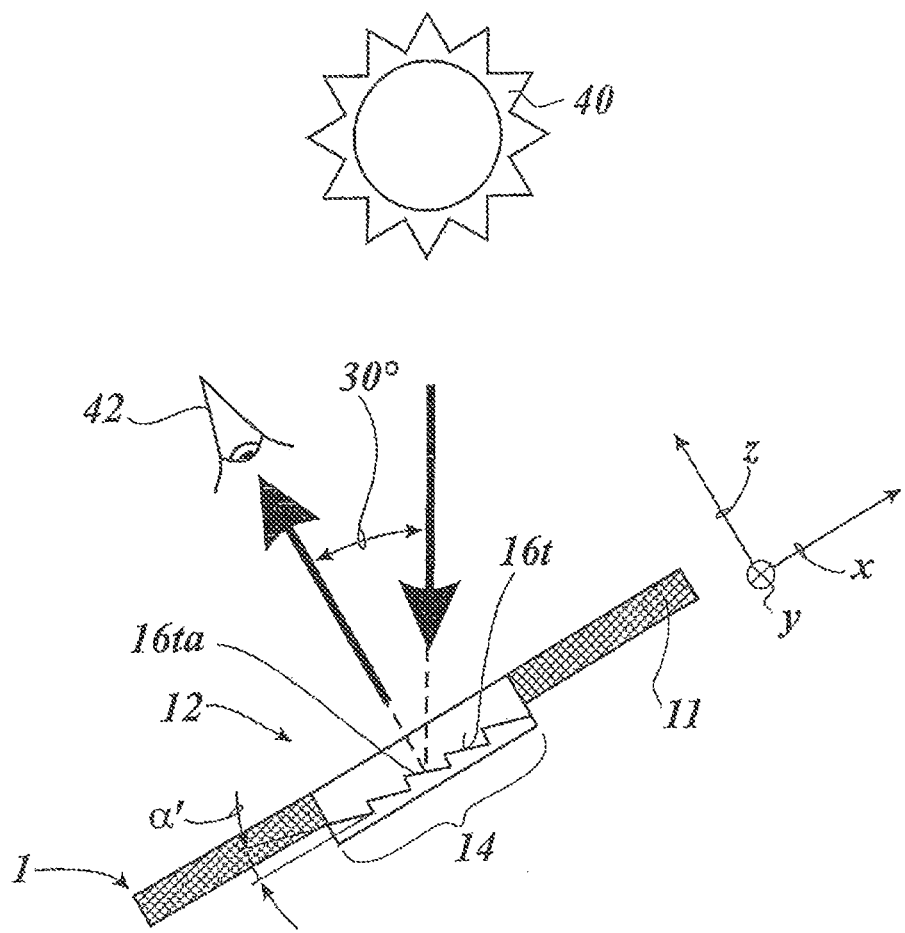
FIG. 5b shows a diagrammatic view of the function of the relief structure in FIG. 3b when viewing from the rear side.

FIGS. 5*a* and 5*b* now show the mode of operation of the security element 12 when the security document 1 is turned through 180° about the x-axis so that its rear side is lit by the light source 40. An angle of 30° is included between the eye 42 of the viewer and the beams emanating from the light source 40, as illustrated hereinbefore in FIGS. 4*a* and 4*b*.

Now, no light passes into the eye 42 of the viewer from the F-shaped region 12*f* (see FIG. 2) for the first flanks 16*fa* of the relief structure 16*f* have now been moved into such a position that they rise like the first flanks 16*ta* in FIG. 4*b*. Consequently the beams emitted by the light source 40 are deflected past the eye 42 of the viewer.

Now, in a similar manner, in FIG. 5*b* the first flanks 16*ta* of the relief structure 16*t* have been moved into such a position that they fall like the first flanks 16*fa* in FIG. 4*a*. The beams from the light source 40 are deflected into the eye 42 of the viewer and the letter 'T' stands out in brightly lit form from its surroundings.

FIGS. 4*a* to 5*b* therefore show that the transparent security element, depending on the viewing direction from the front side or from the rear side, provides different optical information, in the illustrated example the letters 'F' or 'T'. Such a security feature is particularly effective because it is contrary to the 'sound human understanding' that different characters appear on a transparent surface, depending on the side from which the transparent surface is viewed.

It can also be provided that the relief structures 16*f* and 16*t* are of different dimensions, for example they differ from each other in the grating constant and/or the profile depth. It can for example be provided that the relief structure 16*f* forms an achromatic blazed grating and the relief structure 16*t* forms a chromatic blazed grating. For that purpose the relief structure 16*t* can have a grating constant of 1 μm. In that way the region 12*t* appears as a region which shimmers in the spectral colours.

FIGS. 6*a* to 6*d* now show embodiments of a structure layer 66 which on its top side has a relief structure 66*r* which is provided in a transparent security element 62 in the interface between the structure layer 66 and a layer 66*k* arranged thereon, for example an adhesive layer. The two layers involve different refractive indices, as described in detail hereinbefore with reference to FIGS. 2 to 5*b*. The structure layer 66 can be for example a hot stamping layer. The relief structure 66*r* can be coated with Al or ZnS. It can therefore be provided that firstly the relief structure 66*r* is shaped into the hot stamping layer, the relief structure then being coated with Al or ZnS, and finally the coated relief structure 66*r* is covered over with the adhesive layer 66*k*.

Figure 6A:
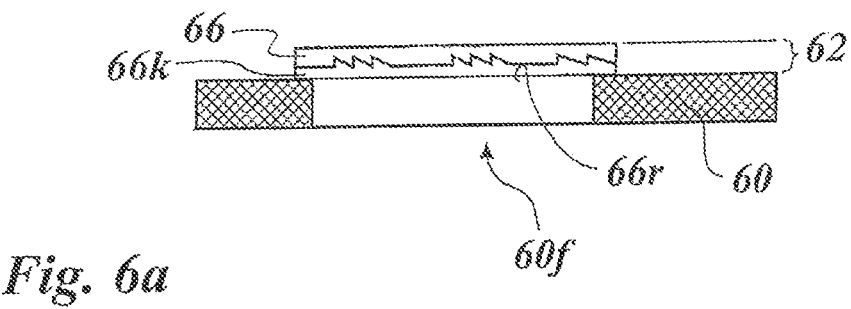
FIG. 6a shows a diagrammatic view in section illustrating a first example of an arrangement of the relief structure of a security element.

FIG. 6*a* shows a carrier 60 which for example can be of a material in paper form and can be provided with a window-shaped opening 60*f* over which the security element 62 is arranged. In that way the security element 62 can be viewed both from its front side and also from its rear side.

Figure 6B:
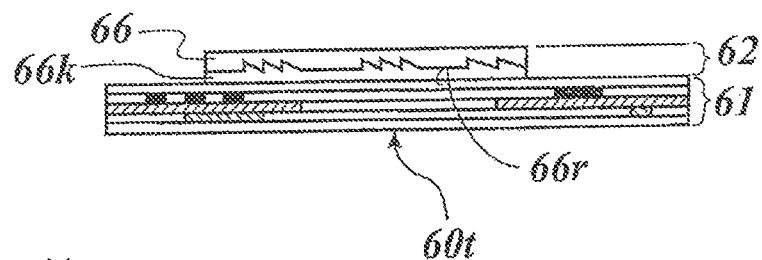
FIG. 6b shows a diagrammatic view in section illustrating a second example of an arrangement of the relief structure of a security element.

FIG. 6b shows a carrier 61 which is in the form of a multi-layer body. In that respect for example it may involve an identity card or a plastic banknote which is laminated from a plurality of layers. The carrier 61 has a transparent window region 60t on which the security element 62 is arranged on the front side of the carrier 61. The security element 62 can be viewed both from its front side and also through the transparent window region 60t of the carrier 61 from its rear side.

Figure 6C:
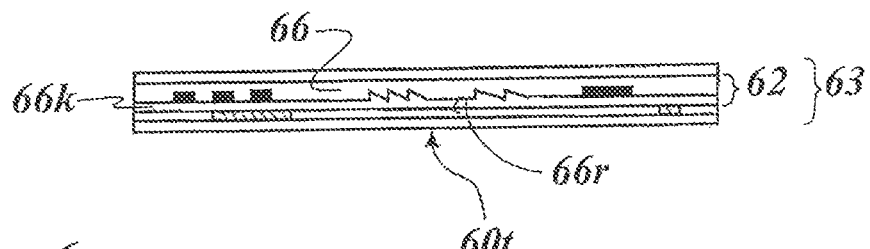
FIG. 6c shows a diagrammatic view in section illustrating a third example of an arrangement of the relief structure of a security element.

FIG. 6c now shows a carrier 63 which is in the form of a multi-layer body and which, as in FIG. 6b, can be an identity card which is laminated from a plurality of layers. Regions of two layers arranged in the interior of the carrier 63 now form the security element 62. In that region, all other layers of the carrier 63 are transparent so that the security element 62 can be viewed both from its front side and also from its rear side. As described hereinbefore the layer 66k can be an adhesive layer.

Figure 6D:
FIG. 6d shows a diagrammatic view in section illustrating a fourth example of an arrangement of the relief structure of a security element.

Finally FIG. 6d shows a carrier 64 which, like the carriers 61 and 63 described with reference to FIGS. 6b and 6c respectively, forms a multi-layer body. The relief structure 66r is now shaped into the uppermost layer of the carrier 64 and thus forms a security element 62' which comprises only one layer. The cover layer necessary for the optical function, having a different refractive index, is formed by the air surrounding the security element 64. In the embodiment shown in FIG. 6d the relief structure 66r can at the same time form a tactile security feature.

It can be provided that the surface of the relief structure 66r is covered with a metallic reflection layer which is a few nm thick, to improve the reflection of the surface of the relief structure 66r. In a transillumination mode a thin metallic layer appears more or less transparent so that the optical security feature of the security element 62 or 62' respectively is not perceptible in a transillumination mode.

Figure 7A:
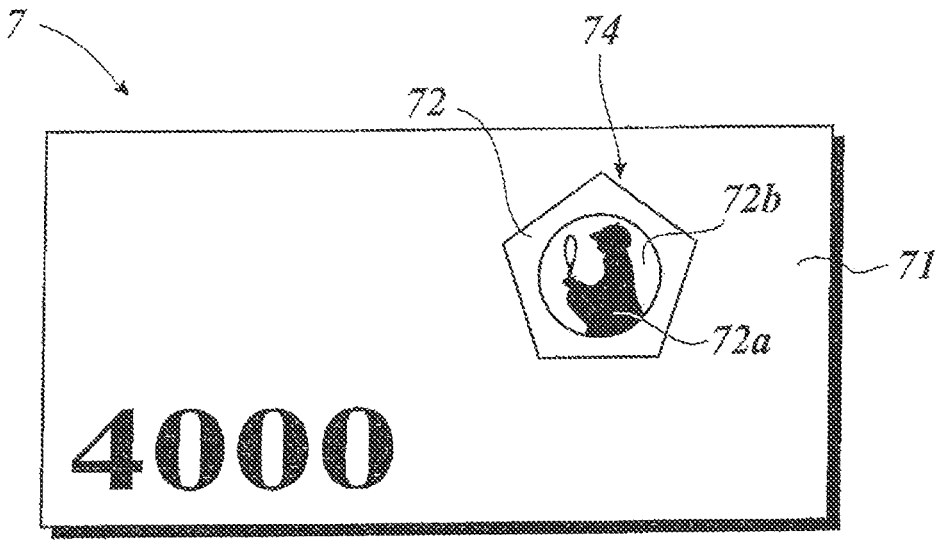
FIGS. 7a and 7b show a second example of use of a security document according to the invention.
Figure 7B:
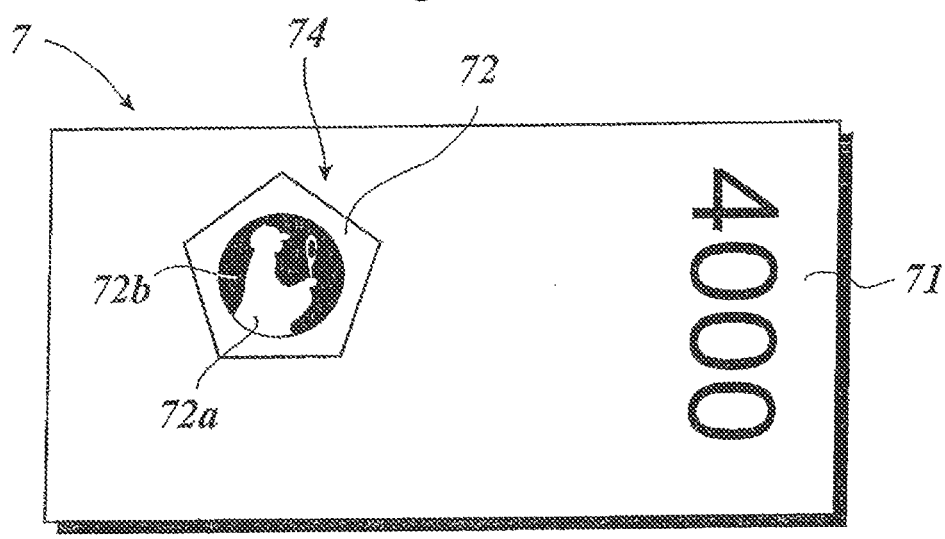

FIGS. 7a and 7b show a second embodiment of a security element according to the invention, with an asymmetrical relief structure.

FIG. 7a shows a security document 7 having a security element 72 as a front view while FIG. 7b shows a rear view of the security document 7.

In the example shown in FIGS. 7a and 7b the security document 7 is a value-bearing document, for example a banknote or a cheque.

The security document 7 comprises a flexible carrier 71 having a window-shaped opening 74 which is closed again by the application of the transparent security element 72. In other respects the carrier 71 can be fashioned like the carrier 11 described with reference to FIGS. 1a and 1b.

As shown in FIGS. 7a and 7b, a graphic representation in the form of a region 72a is to be seen on the security element 72, when viewing the front side of the security document 7. The region 72a is arranged in a region 72b. The two regions differ from each other in terms of their brightness and/or colour when the security document is viewed under incident light, in the manner described with reference to FIGS. 4a and 4b. The two regions involve the same asymmetrical relief structure, the relief structure in the region 72b being rotated through 180° about the y-axis with respect to the relief structure shaped in the region 72a. They may however also involve different asymmetrical relief structures which light up in a similar angular range. In the embodiment shown in FIG. 7a therefore only the light which is reflected by the sawtooth flanks of the relief structure shaped into the region 72b passes into the eye of the viewer (not shown) so that the region 72b lights up in a light condition while the region 72a appears dark.

When viewing the rear side of the security document 7 as shown in FIG. 7b, the region 72a is now oriented in such a way that the light reflected by its sawtooth flanks passes into the eye of the viewer. Therefore the region 72a now lights up in a light condition and the region 72b appears dark. It will be seen by comparing FIGS. 7a and 7b that the graphic representation on the security element 72 on the rear side is not only in mirror-image reversed relationship in relation to the graphic representation which can be seen on the front side, but that a contrast reversal is also visible.

The relief structures provided in the regions 72a and 72b in FIGS. 7a and 7b have a grating constant of about 1 μm. They therefore deflect the diffracted light in different directions in dependence on the wavelength of the light so that the regions 72a and 72b respectively light up in the colours of the rainbow when illuminated with daylight. Such relief structures can also be used under disadvantageous illumination conditions, for example under diffuse illumination. They can be used in the manner of watermarks in the present KINEGRAM® designs and therefore can also be referred to as diffractive watermarks. They can be imitated only with very great difficulty, if at all, by symmetrical relief structures, for example of a sine-square configuration. It can therefore be provided that the security element 72, outside the regions 72a and 72b, is in the form of a KINEGRAM® which forms an image background which gives the same optical impression both when viewed from the front side and also from the rear side.

The above-described embodiments provide that both relief structures involve asymmetrical relief structures. It can however also be provided that only one of the two relief structures is of an asymmetrical configuration and the second relief structure is a symmetrical relief structure, a matte structure or simply a flat surface.

If the term sawtooth is used here in connection with the asymmetrical relief structure, it is not limited to relief structures with a constant flank width $x_1 x_2$ or flanks which are in the form of straight lines. It can also involve flanks which can be described by non-linear functions if the first flank differs from the following second flank, that is to say the two flanks are not of mutually symmetrical configuration. It can further involve relief structures in which the flank width increases or decreases over the extent thereof, that is to say in which the spatial frequency is not constant and/or the depth varies.

Figure 8A:
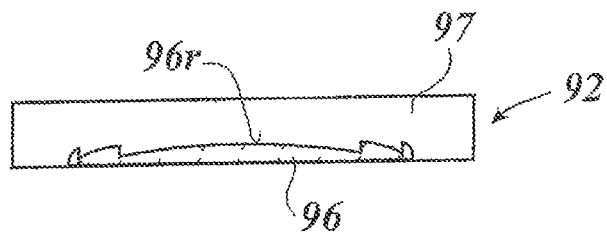
FIG. 8a shows a diagrammatic view in section of a curved mirror produced from an asymmetrical relief structure.
Figure 8B:
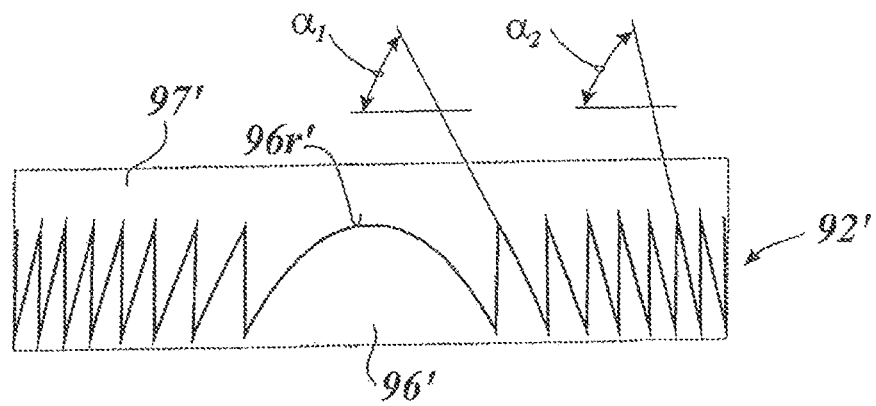
FIG. 8b shows a second diagrammatic view in section of a curved mirror produced from an asymmetrical relief structure on an enlarged scale.

FIG. 8 shows a transparent security element 92 with a structure layer 96 having a relief structure 96r which produces the visual impression of a lens or a hollow mirror. The relief structure 96r is an asymmetrical relief structure whose flank width or period length increases or decreases over the extent thereof and the flanks of which are of a non-linear nature. The same effect however can also be achieved with linear flanks and generally with diffractive relief structures with a non-constant spatial frequency. The change in the spatial frequency and/or depth is related at the same time to a change in the flank steepness, that is to say the flank steepness increases with increasing spatial frequency, as shown in detail hereinafter in FIG. 8b.

The structure layer 96 is covered with a structure layer 97. The structure layer 97 can be for example a protective lacquer layer. It can however also be a layer with a high refractive index so that the degree of reflection of the relief structure 96r is improved. It can therefore be provided that the difference between the refractive indices of the two structure layers 96 and 97 is high, for example 0.8. It can further be provided that the structure layer 97 is a hot stamping layer and the structure layer 96 is an adhesive layer or vice-versa.

FIG. 8*b* now shows a view on an enlarged scale of a transparent security element 92' having a structure layer 96' having an asymmetrical relief structure 96*r*' whose period length increases or decreases over the extent thereof. In FIG. 8*b*, $\alpha_1$ is a flank angle of an inwardly disposed flank and $\alpha_2$ is a flank angle of a further outwardly disposed flank. As can be seen from FIG. 8*b* the following relationship applies:

$$\alpha_1 > \alpha_2,$$

that is to say the further outwardly disposed flank extends more steeply than the further inwardly disposed flank. At the same time the spatial frequency rises with falling period length for the spatial frequency is inversely proportional to the period length or flank width.

In a similar manner a change in depth, with the flank width remaining the same, causes a change in the flank angle, the flank angle increasing with increasing depth.

Figure 9A:
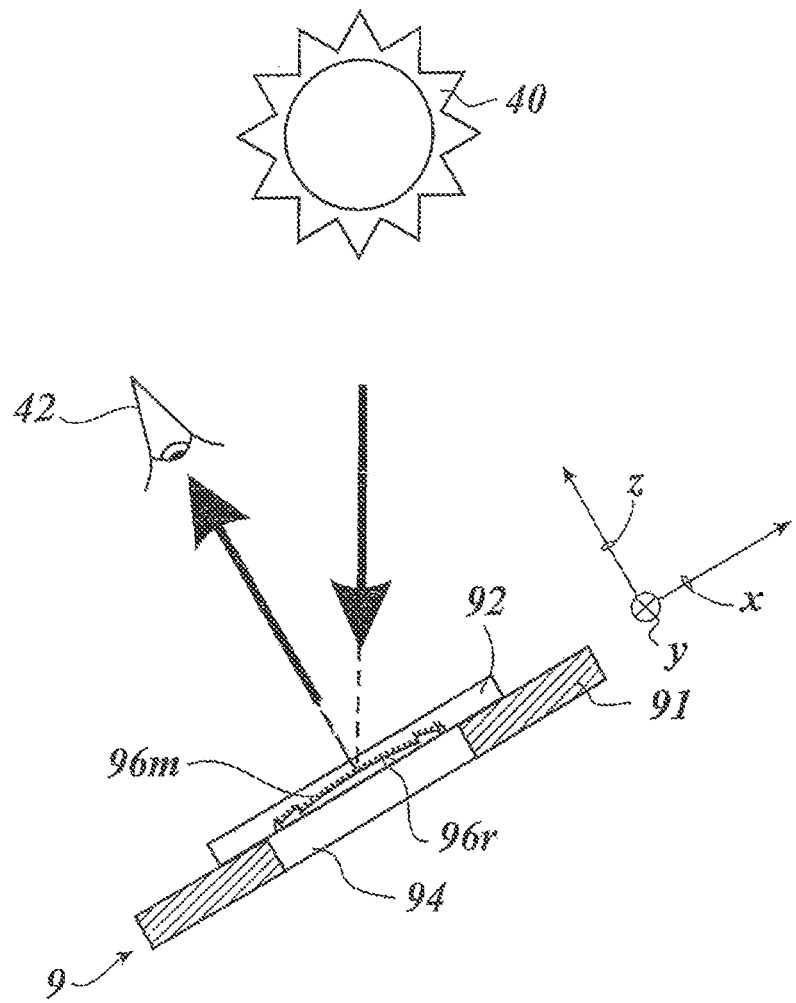
FIG. 9a shows a diagrammatic view of the function of the relief structure in FIG. 8 when viewing from the front side.
Figure 9B:
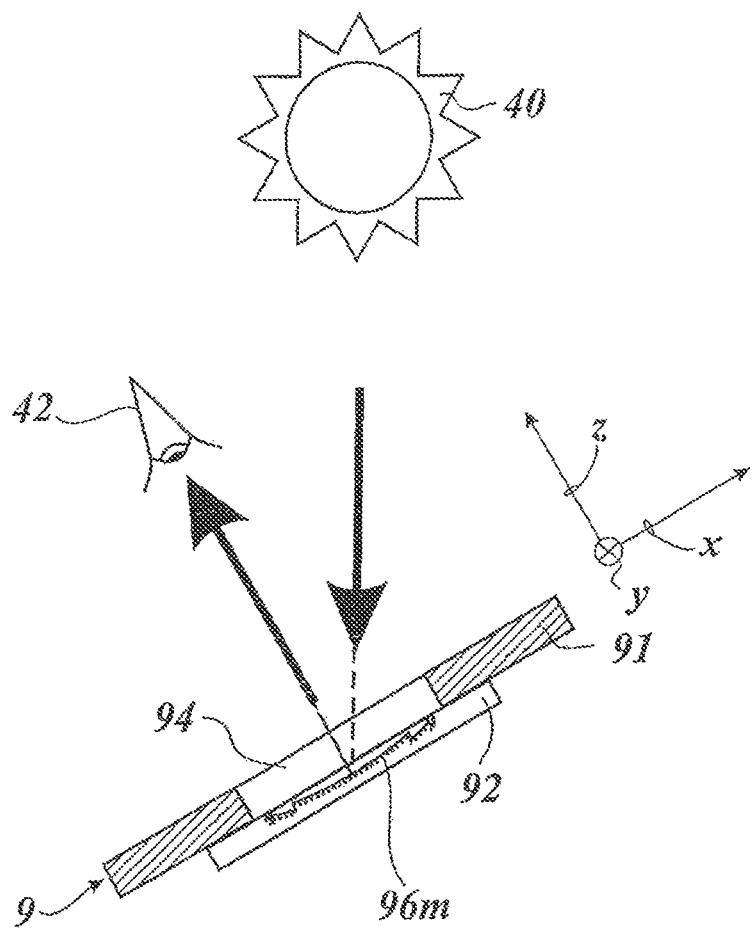
FIG. 9b shows a diagrammatic view of the function of the relief structure in FIG. 8 when viewing from the rear side.

In the incident light mode, depending on the respective viewing direction, the relief structure 96*r* can act as a convex or a concave hollow mirror. Design elements such as images or graphics, logos or text can be arranged visibly for the viewer by means of the hollow mirror over or under the surface of the security element. FIGS. 9*a* and 9*b* describe that optical effect in greater detail.

FIG. 9*a* shows a security document 9 provided with the transparent security element 92 described with reference to FIG. 8*a*. The security document 9 comprises a flexible carrier 91 on which the security element 92 is arranged in a window-shaped opening 94. In other respects the carrier 91 can be like the carrier 11 described with reference to FIGS. 1*a* and 1*b*. In the region 94 it has a window-shaped opening which is closed again by application of the security element 92.

The relief structure 96*r* of the structure layer 96 is covered with a thin metallic layer 96*m* in the embodiment illustrated in FIGS. 9*a* and 9*b* to improve reflection. The metallic layer 96*m* is a few nm in thickness and therefore appears transparent in light shining therethrough. It does however reflect incident light. A non-transparent metallic layer can also be present in region-wise manner.

In the position shown in FIG. 9*a*, the security element 92 forms a convex hollow mirror which produces a reduced-scale virtual image in the eye 42 of the viewer of an object arranged in front of the hollow mirror, the virtual image being behind the surface of the carrier 91. The object can be, for example, an image or graphics or a text or an OVD which is arranged at a suitable spacing from the surface of the carrier. The spacing which is selected substantially in accordance with the focal length of the hollow mirror can be produced for example by a transparent carrier layer of suitable thickness. It can also be provided that the object is to be arranged in a second window-shaped opening in the security document 9 and the second window-shaped opening is brought into such a position, by folding the security document 9, that the object, the image of which is to be produced in the hollow mirror, is over the window-shaped opening 94.

FIG. 9*b* now shows the security document 9 after rotation through 180°, that is to say the eye 42 of the viewer is now directed on to the rear side of the security element 92. The relief structure 96*r* now simulates a concave hollow mirror. The hollow mirror produces a magnified real image of an object arranged in front of the hollow mirror, the real image being in front of the surface of the carrier 91.

Figure 10A:
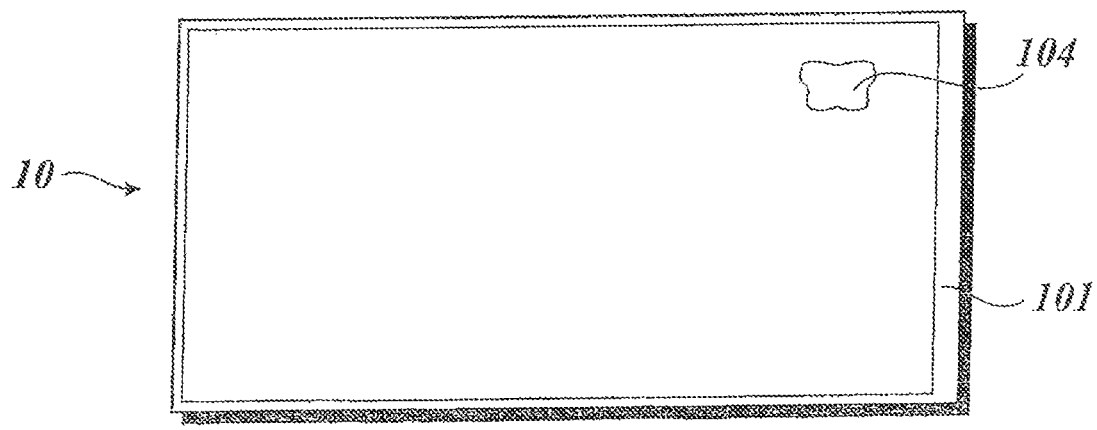
FIGS. 10a to 10c show a third example of use of a security document according to the invention.
Figure 10B:
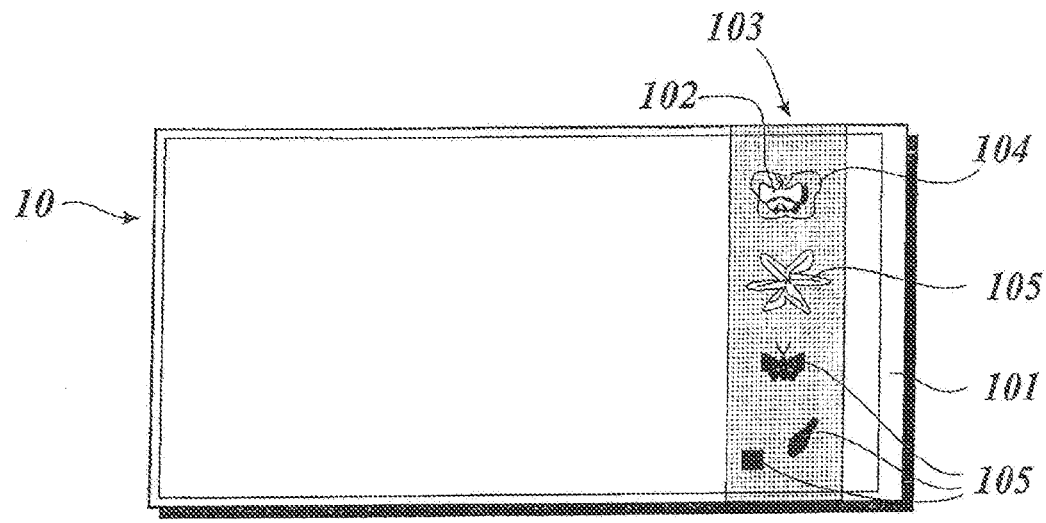
Figure 10C:
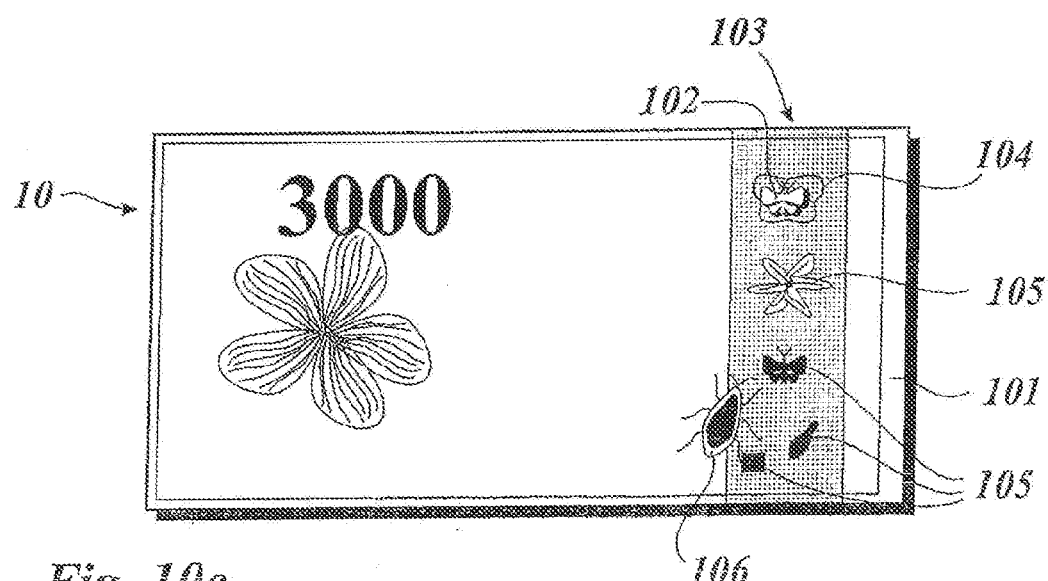

FIGS. 10*a* to 10*c* now show an example of use of the above-described security element 92 in three successive manufacturing steps.

FIG. 10*a* shows a security document 10 comprising a flexible carrier 101 which after the first manufacturing step has a window-shaped opening 104. In the illustrated example the security document 10 is a banknote.

FIG. 10*b* now shows the security document 10 to which a security strip 103 is applied after the second manufacturing step. In the upper portion the security strip 103 has a security element 102 which covers over the window-shaped opening 104 provided in the flexible carrier 101. An image of a butterfly is applied on the layer arranged in front of the diffractive relief structure and on the side, remote from the relief structure, of the other structure layer (see references 97 and 96 in FIG. 8) of the security element 102. Because of the action in the form of a hollow mirror of the relief structure of the security element 102, the butterfly appears to stand out or hover under or over the surface of the security document 10 depending on viewing from the front or from the rear of the security document 10. That optical impression is still further increased on the front side of the security document 10 by the security strip 103 being printed upon with graphic representations 105 which inter alia form optical reference points.

FIG. 10*c* shows the security document 10 after completion thereof. Provided besides the value imprint and graphic decorative elements which are applied by printing is a graphic security element 106 which is so applied that it covers over a region of the security strip 103 and is therefore destroyed upon detachment of the security strip 103.

As shown in FIGS. 11 and 12, it can further be provided that the structure layer has a third region 121 which exhibits the same optical effect when viewed from the front side and from the rear side. Such a region can act as a background region. It can be provided that the third region 121 is provided with a symmetrical diffractive relief structure 161, for example being in the form of a hologram or a KINE-GRAM®.

It can further be provided that the third region 121 is in the form of a matte structure of a thin layer system. The matte structure is a diffusively light-scattering relief structure which therefore appears matte. Such a relief structure can typically involve a structure depth of $\leq 10$ µm. A Fourier hologram or a computer-generated hologram, referred to as a kinoform, with a concealed feature, can also act as a matte structure. The function thereof is to project a concealed feature in a reflection or a transmission mode.

In a further advantageous configuration it is provided that a liquid crystal layer is arranged in the third region 121. Such a region can be for example in the form of a black region or a multi-colour region or may only be visible in the UV or infrared range or may give the impression of a precious stone.

The invention claimed is:
1. A security document comprising:
a carrier substrate defining a transparent window portion;
a security strip disposed on said carrier substrate, said security strip having a transparent security element and an image applied on a surface of the transparent security element, said transparent security element and said image being disposed within said transparent window portion of said carrier substrate, said transparent security element comprising:

a transparent structure layer having an asymmetrical diffractive relief structure shaped into a first surface thereof, said relief structure forming a lens structure having a central optical axis, said relief structure further forming a plurality of sloped flanks starting a distance from said central optical axis and extending in at least two directions with changing spatial frequency or depth, said lens structure appearing as a concave lens structure as viewed from a front side of the security element and further appearing as a convex lens structure as viewed from an opposite rear side of the security element;

a transparent layer disposed over said first surface of said transparent structure layer, said transparent layer having a difference in refractive index with respect to said transparent structure layer of >0.2; and a reflection layer disposed over said relief structure of said transparent structure layer, said reflection layer having a thickness to permit a portion of light to pass therethrough, but to also reflect a portion of light incident thereon, wherein light incident on the front side of the security element and also light incident on the rear side thereof is diffracted in a first region by the relief structure, and wherein said image applied on said transparent security element is disposed a distance from said relief structure along said central optical axis of said lens structure such that the relief structure produces a virtual image of said applied image in incident light which is different in the front view and in the rear view such that the virtual image visible to the viewer on the front side and the rear side is not merely a laterally reversed representation of the virtual image visible on the opposite side.

2. A security document as defined in claim 1, wherein the slope of each flank changes starting from the distance from said central optical axis.

3. A security document as defined in claim 1, wherein the depth of each flank changes starting from the distance from said central optical axis.

4. A security document as defined in claim 1, wherein the transparent security element is a transfer layer of a transfer film.

5. A security document as defined in claim 1, wherein the transparent structure layer is disposed on an outer surface of said carrier substrate to form an outer layer of the security document or a portion of an outer layer of the security document.

* * * * *